UNITED STATES PATENT OFFICE.

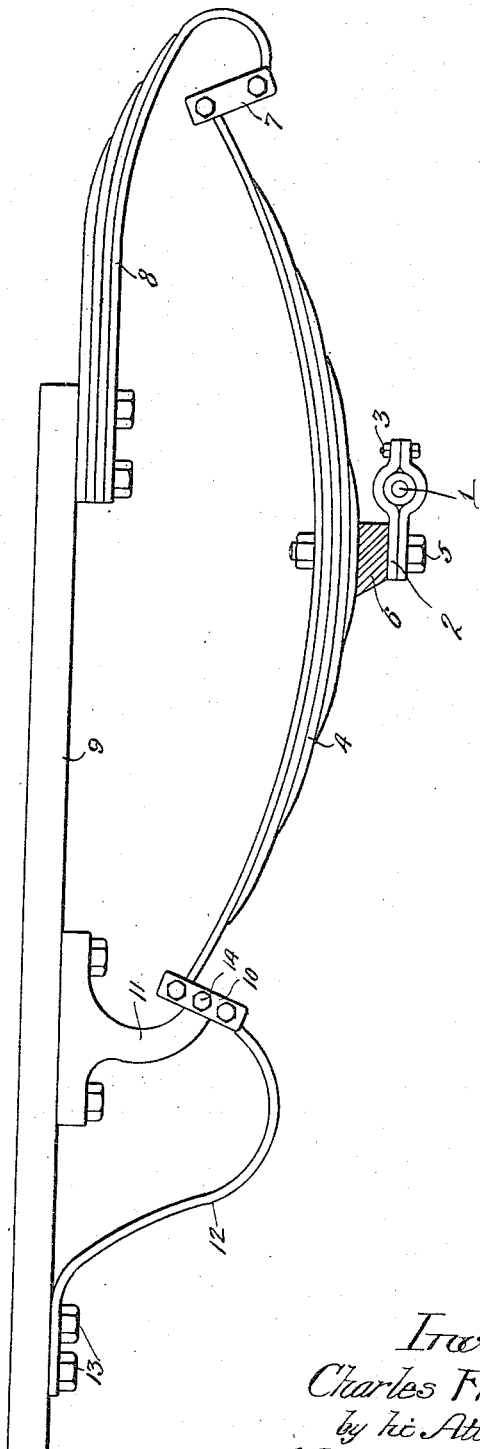

CHARLES FREIHOFER, OF PHILADELPHIA, PENNSYLVANIA.

VEHICLE SPRING CONSTRUCTION.

1,285,107.

Specification of Letters Patent.
Patented Nov. 19, 1918.

Application filed August 24, 1916. Serial No. 116,654.

*To all whom it may concern:*

Be it known that I, CHARLES FREIHOFER, a citizen of the United States, residing in Philadelphia, Pennsylvania, have invented a Vehicle Spring Construction, of which the following is a specification.

One object of my invention is to provide a novel form of spring suspension particularly designed for vehicles, which while being simple, substantial and comparatively inexpensive, shall in a great measure prevent the transmission of shocks from the running gear to the body of the vehicle.

A further object of the invention is to provide a novel combination of springs designed to act as a shock preventer.

These objects and other advantageous ends I secure as hereinafter set forth, reference being had to the accompanying drawings, in which:—

The figure is a side elevation illustrating my invention.

In the above drawing, 1 represents the axle of a vehicle on which is rotatably mounted a bracket 2 shown as made in two similar separable parts extending around the axle and on one side thereof held together by a bolt 3. On the opposite side of said axle these two parts are held together and to the central portion of a semi-elliptic spring 4 by a bolt 5, there being a pad or block 6 interposed between said spring and the bracket 2.

One end of the spring 4 is connected through a shackle 7 with the upwardly turned small end of a quarter elliptic spring 8 whose thick end is bolted to and supports one end of a wagon body or frame 9. The opposite end of said spring 4 is connected to one end of a shackle 10 which adjacent its center is pivotally supported on a bracket 11, extending downwardly from the body 9. The opposite end of the shackle 10 is connected to one end of a flat spring 12 of plate or bar material which is reversely curved and has its other end connected by bolts 13 to the body.

As the result of a sudden jar to the axle 1, such as would cause it to suddenly and violently move upward, the spring 4 transmits a certain portion of such upward movement to its shackles 7 and 10. The first of these swings on its pivotal connecting bolt and also forces upwardly the projecting end of the spring 8, and the same upward force transmitted through the spring 4 turns the shackle 11 on its pivotal supporting bolt 14. Such movement, however, is yieldingly resisted by the spring 12 and as a result the force of the sudden movement of the axle 1 is largely absorbed by the springs 4, 8 and 12.

Similarly a movement of the axle 1 away from the body is resisted and the shock of such movement is dampened or absorbed by the spring 8 on the one hand and by the spring 12 on the other, the latter spring in any case tending to yieldingly prevent movement of the shackle 10 on its pivot. Obviously the vehicle may be equipped with a pair of the structures shown at its front end and a second pair at its rear end, although if desired said rear end may be equipped with some other form of supporting means without departing from my invention.

I claim:—

1. The combination of an axle; an elongated semi-elliptic spring mounted thereon; a frame; a quarter-elliptic spring connected between the frame and one end of said first spring; a bracket on the frame; a member pivoted to the bracket and connected to the second end of the semi-elliptic spring; with a third spring of strip material having one end fixed to the frame and its other end connected to said pivoted member.

2. The combination of an axle; a frame; a semi-elliptic spring on the axle; a quarter elliptic spring connected between one end of the first spring and the frame; a shackle movably connecting the second end of the first spring to the frame; and a third spring having one end fixed to the frame and its second end connected to the shackle to oppose its movement.

3. The combination of an axle; a bracket rotatably mounted on said axle and projecting at one side thereof; a spring connected to said projecting part of the bracket; a frame; means for connecting one end of the spring to the frame; a member pivotally mounted on the frame and connected to the other end of the spring; with means for yieldingly opposing movement of said member.

CHARLES FREIHOFER.